(12) United States Patent
Nakano et al.

(10) Patent No.: US 6,622,576 B1
(45) Date of Patent: Sep. 23, 2003

(54) TORQUE SENSOR HAVING PERIOD DETECTION MEANS

(75) Inventors: Jiro Nakano, Okazaki (JP); Ichiro Nagashima, Nagoya (JP); Hisashi Oue, Aichi-ken (JP); Takatsugu Asano, Toyohashi (JP); Takeshi Tsukamoto, Nagoya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/386,166

(22) Filed: Aug. 31, 1999

(30) Foreign Application Priority Data

Sep. 1, 1998 (JP) .......................................... 10-263988
Nov. 30, 1998 (JP) .......................................... 10-339936

(51) Int. Cl.[7] ................................................ G01L 3/02
(52) U.S. Cl. .................. 73/862.331; 73/862; 73/862.08
(58) Field of Search ..................... 73/862.331, 862.332, 73/862.333, 862.334

(56) References Cited

U.S. PATENT DOCUMENTS 4,881,414 A * 11/1989 Setaka et al. ........... 73/862.331
4,907,460 A * 3/1990 Taniguchi et al. ...... 73/862.331
5,641,916 A * 6/1997 Satoh et al. ........... 73/862.331
5,752,208 A   5/1998 Lerner ......................... 701/41
5,811,695 A * 9/1998 Satoh et al. ........... 73/862.331

FOREIGN PATENT DOCUMENTS

| JP | 4-198825 | 7/1992 |
| JP | 7-198510 | 8/1995 |
| JP | 7-333080 | 12/1995 |

* cited by examiner

Primary Examiner—Edward Lefkowitz
Assistant Examiner—Andre Allen
(74) Attorney, Agent, or Firm—Oblon, Spivak, McClelland, Maier & Neustadt, P.C.

(57) ABSTRACT

A torque sensor is provided with a coil whose inductance changes in accordance with variation in torque acting on an object. The torque is detected on the basis of the inductance of the coil. Specifically, the torque sensor includes a first oscillation circuit for detecting the inductance of the coil and for oscillating a signal having a period corresponding to the detected inductance. The period of the signal generated by the first oscillation circuit is detected by a period detection section. A torque detection section detects the torque on the basis of the period detected by the period detection section.

9 Claims, 11 Drawing Sheets

TORQUE SENSOR HAVING PERIOD DETECTION MEANS

BACKGROUND OF THE INVENTION

1. Field of the Invention

The present invention relates to a torque sensor for sensing torque acting on an object, and more particularly to a torque sensor suitable for sensing torque that acts between an input shaft connected to a steering wheel of a vehicle and an output shaft connected to a steering mechanism of the vehicle.

2. Description of the Related Art

Figure 1:
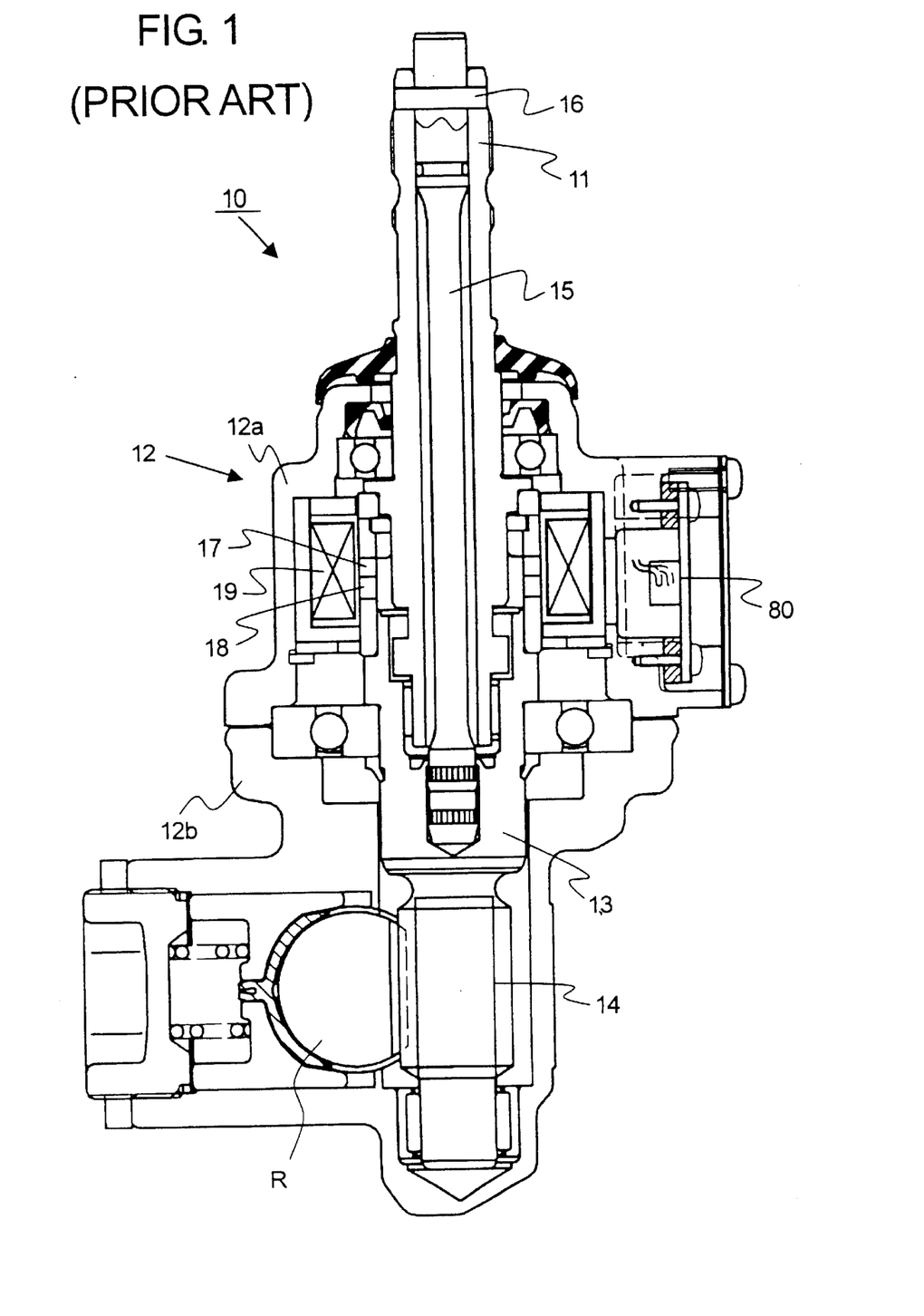
FIG. 1 is a longitudinal cross section of a power steering apparatus in which a conventional torque sensor is used.

Conventionally, a torque sensor of the above-described type has been used in a steering mechanism as shown in FIG. 1.

First, the structure of the conventional steering mechanism will be described with reference to FIG. 1.

A steering mechanism 10 shown in FIG. 1 comprises a hollow shaft 11 connected to a steering wheel (not shown) of a vehicle. A lower portion of the shaft 11 passes through and is supported by an upper portion 12a of a housing 12. Another shaft 13 is inserted into a lower portion 12b of the housing 12. A pinion 14 is provided on a lower portion of the shaft 13, and the pinion 14 is in meshing-engagement with a rack R. An unillustrated motor is provided and drivingly connected to the rack R in order to assist the driver's steering operation.

A torsion bar 15 is accommodated inside the shaft 11. The upper end of the torsion bar 15 is connected to the shaft 11 by means of a pin 16, and the lower end of the torsion bar 15 is in spline-engagement with the shaft 13.

Therefore, when a torque is applied to the shaft 11 upon operation of the steering wheel, the torsion bar 15 is twisted, so that a relative displacement is produced between the shaft 11 and the shaft 13.

Within the housing 12, a sensor ring 17 formed of a magnetic material is provided on the shaft 11, and a sensor ring 18 formed of a magnetic material is provided on the shaft 13. Further, a torque sensing coil 19 is provided inside the housing 12 such that the torque sensing coil 19 surrounds the sensor rings 17 and 18 with a predetermined gap formed therebetween. When a relative displacement is produced between the shafts 11 and 13, the amount of overlap between the sensor rings 17 and 18 changes, resulting in a change in the inductance of the torque sensing coil 19. Thus, a signal corresponding to the sensed torque is obtained from the torque sensing coil 19. The torque sensing coil 19 is connected to an interface circuit (hereinafter referred to as an "I/F circuit") 80 disposed at the right end of the housing 12 in FIG. 1. The I/F circuit 80 is connected to a microcomputer (not shown) provided in the vehicle.

Figure 2:
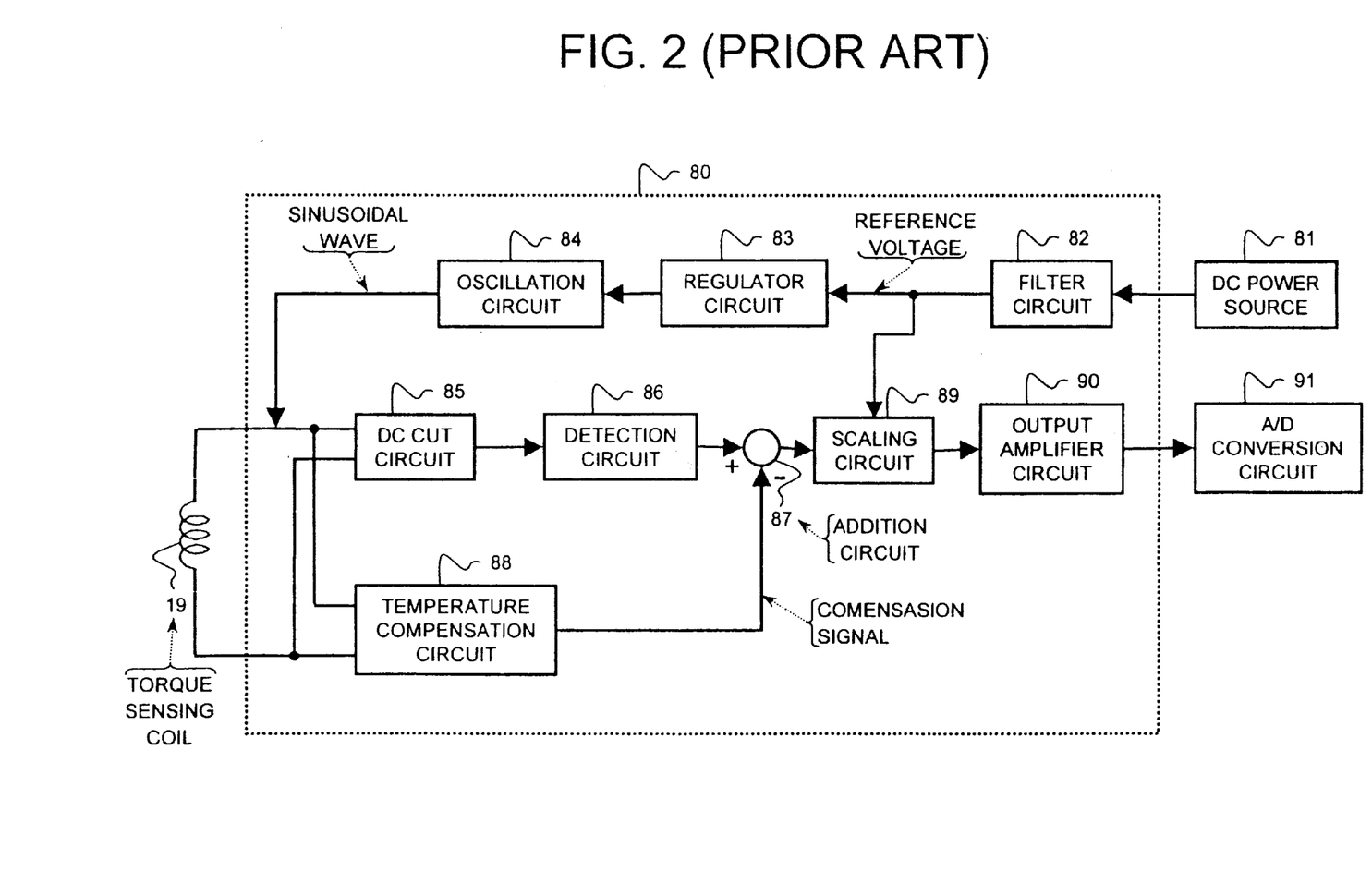
FIG. 2 is a block diagram showing the electrical configuration of the torque sensor used in the power steering apparatus of FIG. 1.

Next, operation of the I/F circuit 80 will be described with reference to FIG. 2.

DC current supplied from a DC power source 81 is supplied to a regulator circuit 83 via a filter circuit 82, which eliminates unnecessary harmonic components from the DC current. The regulator circuit 83 receives the DC current output from the filter circuit 82 and generates a reference voltage. An oscillator circuit 84 generates a sinusoidal signal on the basis of the reference voltage output from the regulator circuit 83. The sinusoidal signal is applied to the torque sensing coil 19.

As a result, a sinusoidal voltage corresponding to the inductance of the torque sensing coil 19 is generated between the opposite ends of the torque sensing coil 19. The AC component is extracted from the sinusoidal voltage by a DC cut circuit 85 and is detected by a detection circuit 86, so that a DC voltage proportional to the amplitude of the extracted AC component is output from the detection circuit 86. The DC voltage is then input to an addition circuit 87.

The sinusoidal voltage generated between the opposite ends of the torque sensing coil 19 is input to a temperature compensation circuit 88, which outputs a temperature drift signal that indicates variation in the inductance of the torque sensing coil 19 caused by temperature. The temperature drift signal is input to the addition circuit 87.

The addition circuit 87 calculates a difference between the signal output from the detection circuit 86 and the temperature drift signal output from the temperature compensation circuit 88 and cancels out the temperature drift component to thereby output a torque component signal, which is output to a scaling circuit 89. The scaling circuit 89 amplifies the torque component signal at a preset gain to thereby scale up the torque component signal. The scaled-up torque component signal is amplified by an output amplifier circuit 90. Subsequently, after being amplified by the amplifier circuit 90, the torque component signal is output to an A/C conversion circuit 91 as a torque signal, so that the torque signal is converted to a digital signal, which is output to a microcomputer provided in the vehicle.

On the basis of the magnitudes of input digital signals, the microcomputer calculates an amount of assist to be applied to the steering mechanism and outputs to the motor a drive signal corresponding to the calculated amount of assist. Thus, the steering mechanism is assisted through rotation of the motor.

However, the above-described conventional torque sensor requires a large number of circuits, such as a circuit for applying a sinusoidal signal to the torque sensing coil 19 and a circuit for sensing the inductance of the torque sensing coil 19 as torque, which makes it difficult to enhance the reliability of the torque sensor.

Further, in the conventional torque sensor, since the torque signal output from the output amplifier circuit 90 is an analog signal, torque cannot be detected unless the voltage applied to the circuits is prevented from becoming lower than the operation voltage of the microcomputer even when a voltage drop occurs.

Therefore, in addition to a power source for the microcomputer, there must be provided a DC power source 81 which supplies the oscillation circuit 84 with a voltage (e.g., 8V) higher than the operating voltage (e.g., 5V) of the microcomputer.

As described above, the conventional torque sensor is complicated in terms of circuit configuration and requires a plurality of power sources, which makes it difficult to improve reliability and reduce manufacturing costs.

SUMMARY OF THE INVENTION

An object of the present invention is to provide a torque sensor which can simplify the configuration of a circuit for sensing torque and which decreases the number of power sources to thereby improve reliability and reduce production costs.

In order to achieve the above object, the present invention provides a torque sensor which is provided with a coil whose inductance changes in accordance with variation in torque acting on an object and which detects the torque on the basis of the inductance of the coil, the torque sensor comprising:

a first oscillation circuit for detecting the inductance of the coil and for oscillating a signal having a period corresponding to the detected inductance; a period detection section for detecting the period of the signal generated by the first oscillation circuit; and a torque detection section for detecting the torque on the basis of the period detected by the period detection section.

This structure eliminates necessity for provision of an oscillation circuit for applying a sinusoidal signal to the coil. Further, since the signal oscillated by the first oscillation circuit can be input directly to a microcomputer for direct measurement, digital processing becomes simple, and an A/D conversion circuit or a like circuit becomes unnecessary. Further, since torque can be sensed regardless of variation in supplied voltage, a single power source can be used commonly for torque sensing and for the microcomputer. Accordingly, no additional power source is required.

As described above, the circuit configuration can be simplified and the number of power sources can be reduced, as compared to conventional torque sensors. Therefore, the reliability of the torque sensor is improved, and the production cost of the torque sensor is reduced. Further, since the period of a signal corresponding to a generated torque can be measured directly, a response in detecting the generated torque can be improved.

Preferably, a sensing region of the coil where the inductance of the coil is detected is divided into a plurality of regions; and there are provided a first comparison section for comparing a signal detected from one of the divided regions and a signal detected from a predetermined region, and a layer-short detection section for detecting a layer short of the coil on the basis of a result of comparison performed by the first comparison section. The term "predetermined region" means one of the divided regions, a plurality of divided regions, or the entire coil.

When a layer short occurs in the coil, the signal flowing through each of the divided regions changes from the value in the case where no layer short occurs, and the layer short of the coil can be detected through detection of the change in the signal.

The first comparison section is preferably configured to detect a first DC component derived from one of the divided regions and a second DC component derived from the predetermined region, and to compare the first and second DC components. In this case, a layer short of the coil can be detected without influence of variation in the signal generated from the coil.

Preferably, a first DC component detection section is provided for detecting a DC component of current flowing through the coil; and the torque detection section is constructed to perform temperature compensation for the detected torque on the basis of the DC component detected by the first DC component detection section. This structure eliminates necessity for provision of a coil for temperature compensation. Therefore, the size and cost of the torque sensor can be decreased greatly as compared with a torque sensor having a temperature compensation coil. In addition, since the DC component of current flowing through the coil is utilized for temperature compensation, temperature compensation can be performed without influence of variation in the signal generated from the coil.

Preferably, the torque sensor further comprises a second oscillation circuit for oscillating and outputting a signal having a period corresponding to the inductance of the coil; a second comparison section for comparing the signal output from the second oscillation circuit with the signal output from the first oscillation circuit; and a first anomalous state detection section for detecting an anomalous state of the first or second oscillation circuit on the basis of a result of the comparison performed by the second comparison section. This structure enables detection of an anomalous state of the first or second oscillation circuit.

In the case where the torque sensor comprises the first DC component detection section, the torque sensor may further comprise a second DC component detection section which is provided for detecting a DC component of current flowing through the coil; a third comparison section for comparing the DC component detected by the first DC component detection section with the DC component detected by the second DC component detection section; and a second anomalous state detection section for detecting an anomalous state of the first DC component detection section or the second DC component detection section on the basis of a result of the comparison performed by the third comparison section. This structure enables detection of an anomalous state of the first or second DC component detection section.

The above-described oscillation circuit is preferably an LR oscillation circuit using the coil and a resistor. Since the LR oscillation circuit does not use a capacitor, the LR oscillation circuit is hardly affected by ambient temperature.

The above-described second comparison section is preferably configured to compare the phase of the signal output from the first oscillation circuit with the phase of the signal output from the second oscillation circuit. In this case, an anomalous state of the first or second oscillation circuit can be detected without influence of variation in power source voltage that serves as noise.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Embodiments of the present invention will next be described in detail with reference to the drawings.

In the following embodiments, a torque sensor according to the present invention is embodied as a torque sensor for detecting torque that is produced between an input shaft connected to a steering wheel of a vehicle and an output shaft connected to a steering mechanism. The configuration of the torque sensor is identical with that of the conventional torque sensor shown in FIG. 1, except for a torque sensing coil and an I/F circuit. Therefore, descriptions of identical portions will be omitted.

Figure 3:
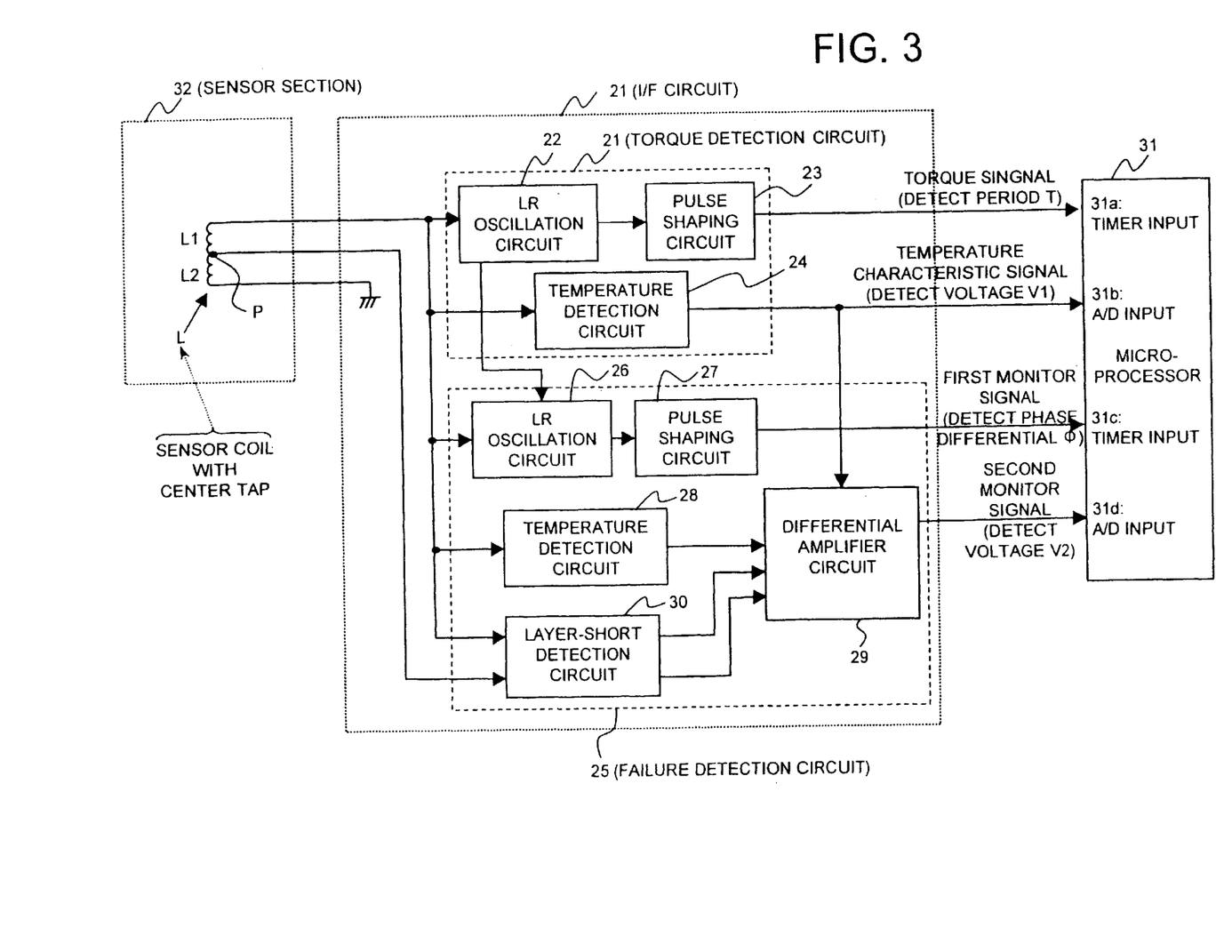
FIG. 3 is a block diagram showing the electrical configuration of a torque sensor according to a first embodiment of the present invention.

FIG. 3 is a block diagram showing the electrical configuration of a torque sensor according to a first embodiment of the present invention.

As shown in FIG. 3, the torque sensor according to the present embodiment comprises a sensor section 32, an I/F circuit 20 connected to the sensor section 32, and a microcomputer 31 connected to the I/F circuit 20. The sensor section 32 includes a torque sensing coil L and sensor rings 17 and 18 (FIG. 1). The torque sensing coil L and the sensor rings 17 and 18, together with a gap therebetween, form a magnetic circuit.

The torque sensing coil L has an intermediate or center tap P provided at a position where the coil L is divided into two coil portions L1 and L2.

The I/F circuit 20 includes a torque detection circuit 21 for sensing torque, and a failure detection circuit 25 for detecting an anomalous state of the torque detection circuit 21 and a layer short of the torque sensing coil L.

Figure 4:
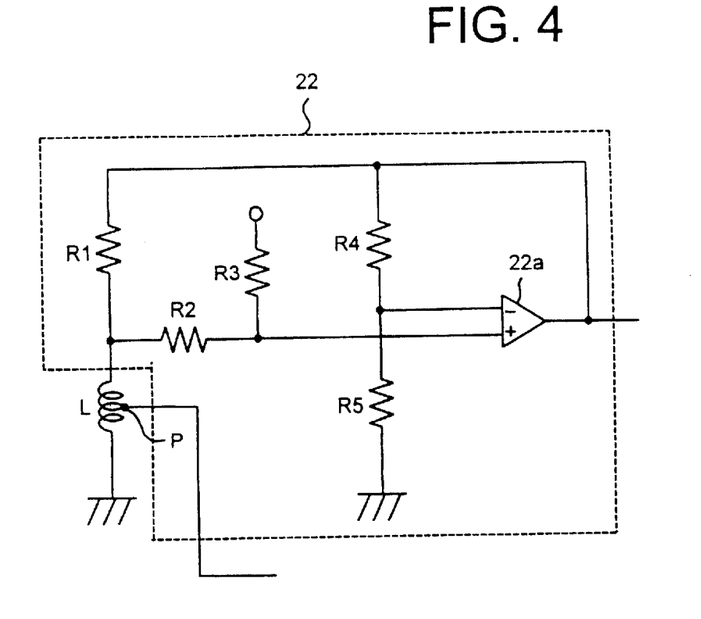
FIG. 4 is a circuit diagram of the LR oscillation circuit shown in FIG. 3.

The torque detection circuit 21 includes an LR oscillation circuit 22. As shown in FIG. 4, the LR oscillation circuit 22 comprises an operational amplifier 22a that operates as a hysteresis comparator and oscillates a signal whose frequency is determined on the basis of the inductance of the torque sensing coil L and a resistor R1. Resistors R2 and R3 form a bias circuit for enabling the oscillation. Resistors R4 and R5 determine a threshold voltage input to the operation amplifier 22a. The thus-generated signal is output from the comparator 22a.

As shown in FIG. 3, a pulse-shaping circuit 23 is connected to the LR oscillation circuit 22. The pulse-shaping circuit 23 shapes the waveform of a signal output from the LR oscillation circuit 22 and outputs a shaped signal to a timer input 31a of the microcomputer 31 as a torque signal.

Further, a temperature detection circuit 24 is connected to the torque detection circuit 21. The temperature detection circuit 24 is connected to the torque sensing coil L in order to detect the temperature of the coil L. The temperature detection circuit 24 is formed of, for example, an AC cut circuit and a scaling circuit. The AC cut circuit extracts a DC component from an AC/DC superposed signal output from the torque sensing coil L. The scaling circuit scales the signal output from the AC cut circuit to thereby convert the signal into a signal (hereinafter referred to as a "temperature characteristic signal") used for correcting the temperature characteristic at a neutral position (in a state in which no torque is produced). The temperature characteristic signal is fed to an A/D input 31b of the microcomputer 31.

The failure detection circuit 25 includes an LR oscillation circuit 26 having a configuration substantially identical with that of the LR oscillation circuit 22 provided in the torque detection circuit 21. Like the LR oscillation circuit 22, the LR oscillation circuit 26 oscillates a signal whose frequency is determined on the basis of the inductance of the torque sensing coil L and a resistor provided in the LR oscillation circuit 26. The LR oscillation circuit 26 oscillates synchronously with the LR oscillation circuit 25. The signal generated by the LR oscillation circuit 26 is subjected to waveform shaping performed by a pulse-shaping circuit 27 and is then fed to a timer input 31c of the microcomputer 31 as a first monitor signal.

When the LR oscillation circuit 22 is not in an anomalous state, the torque signal and the first monitor signal have substantially the same waveform and are synchronized with each other. When the LR oscillation circuit 22 comes into an anomalous state, a phase difference is produced between the torque signal and the first monitor signal and is detected by the microcomputer 31.

The failure detection circuit 25 includes a temperature detection circuit 28 having a configuration substantially identical with that of the temperature detection circuit 24 provided in the torque detection circuit 21. Like the temperature detection circuit 24, the temperature detection circuit 28 is formed of an AC cut circuit and a scaling circuit. The AC cut circuit extracts a DC component from an AC/DC superposed signal output from the torque sensing coil L. The scaling circuit scales the signal output from the AC cut circuit to thereby obtain a temperature characteristic signal, which is fed to a differential amplifier circuit 29.

Figure 5:
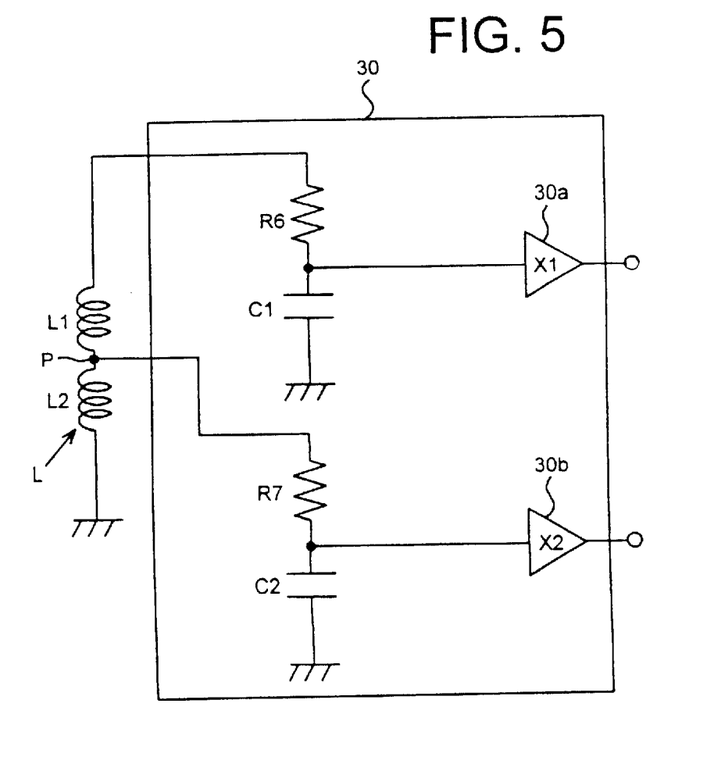
FIG. 5 is a circuit diagram of the layer-short detection circuit shown in FIG. 3.

Further, the failure detection circuit 25 includes a layer-short detection circuit 30 for detecting a layer short of the torque sensing coil L. As shown in FIG. 5, the layer-short detection circuit 30 is connected to an ungrounded end and the intermediate tap P of the torque sensing coil L in order to detect the DC component of an AC/DC superposed signal generated at the ungrounded end and the DC component of an AC/DC superposed signal generated at the intermediate tap P.

More specifically, through use of a resistor R6 and a capacitor C1, the DC component of the AC/DC superposed signal generated at the ungrounded end of the torque sensing coil L is extracted and fed to the differential amplifier circuit 29 via an amplifier 30a. Similarly, through use of a resistor R7 and a capacitor C2, the DC component of the AC/DC superposed signal generated at the intermediate tap P of the torque sensing coil L is extracted. The extracted DC component is amplified by an amplifier 30b to have a doubled amplitude and is then fed to the differential amplifier circuit 29.

The differential amplifier circuit 29 amplifies the signals output from the temperature detection circuit 24, the temperature detection circuit 28, and the layer-short detection circuit 30 and outputs an amplified differential signal to an A/D input 31d of the microcomputer 31 as a second monitor signal. On the basis of the voltage V2 of the signal input to the AID input 31d, the microcomputer 31 detects an anomalous state of the temperature detection circuit 24 and a layer short of the torque sensing coil L.

Next, processing performed by the microcomputer 31 will be described with reference to FIGS. 6–9.

Figure 6A:
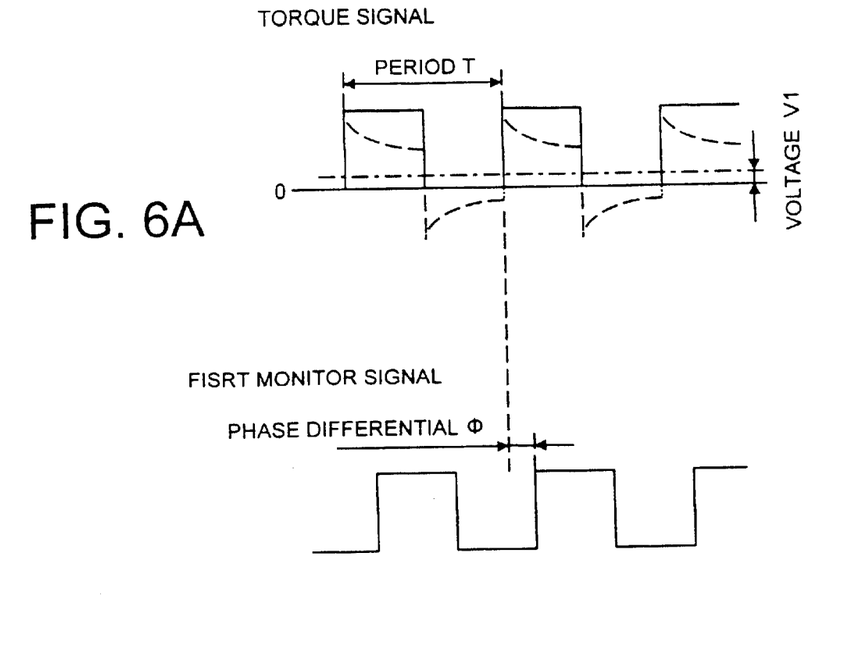
FIG. 6A shows a waveform diagram showing a torque signal, and a waveform diagram showing a first monitor signal.
Figure 6B:
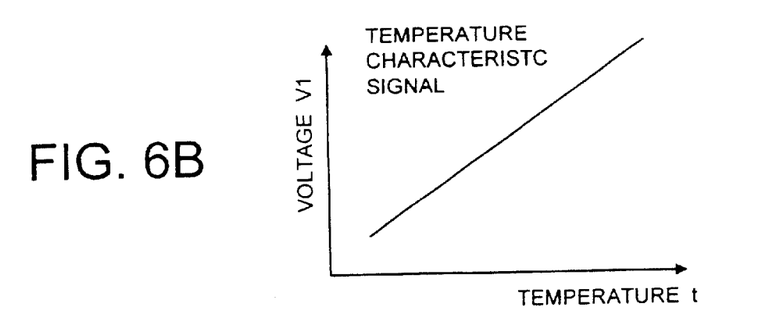
FIG. 6B is a graph showing a temperature characteristic signal.
Figure 6C:
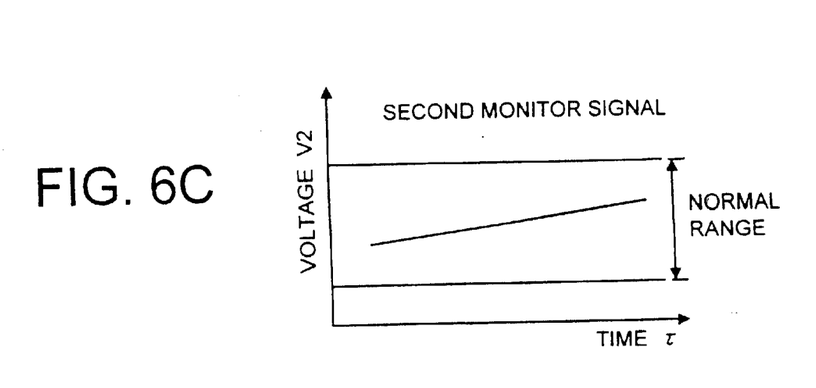
FIG. 6C is a graph showing a relationship between a second monitor signal and its normal range.

FIG. 6A shows a waveform diagram showing a torque signal (a rectangular pulse signal depicted by use of a solid line; a broken line represents the waveform of an output of the torque sensing coil L), and a waveform diagram showing a first monitor signal; FIG. 6B is a graph showing a temperature characteristic signal; and FIG. 6C is a graph showing a relationship between a second monitor signal and its normal range.

Figure 7:
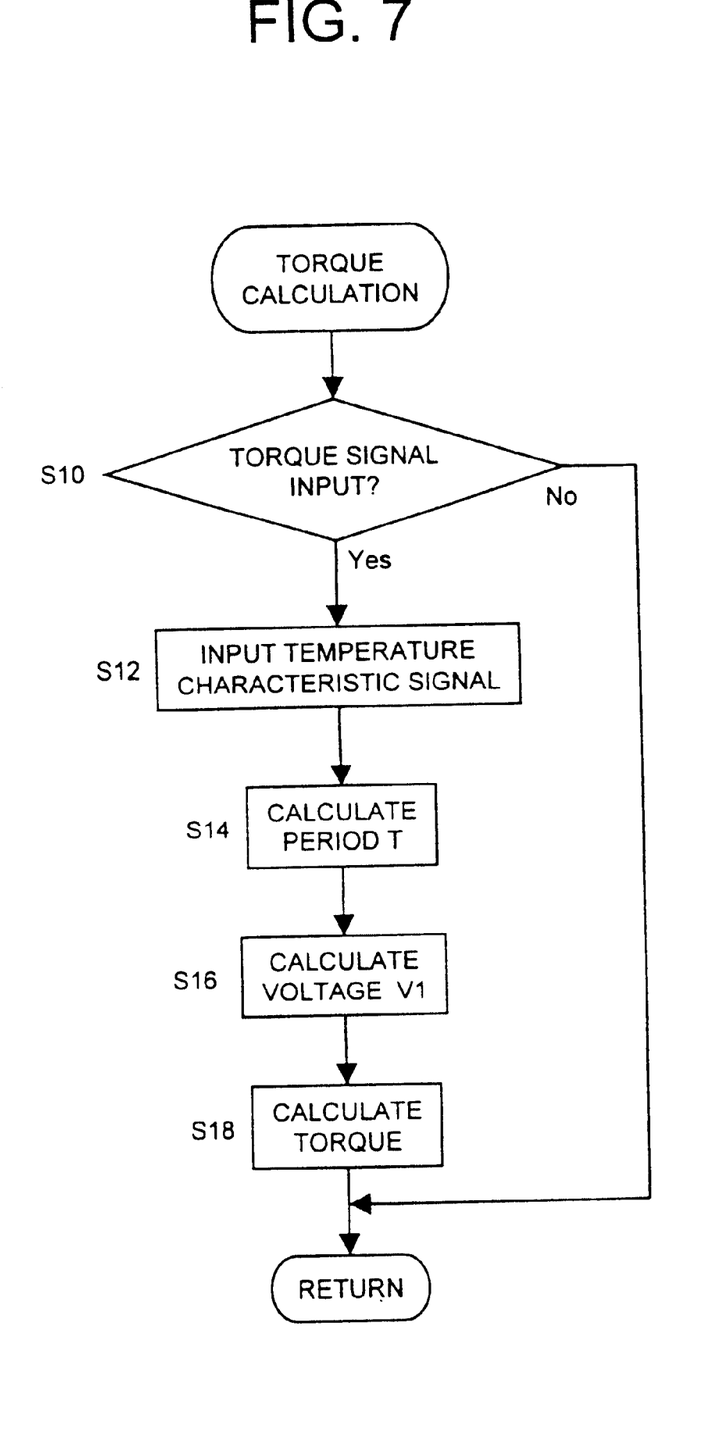
FIG. 7 is a flowchart showing torque calculation processing performed by the microcomputer shown in FIG. 3.

First, torque calculation processing performed by the microcomputer 31 will be described with reference to the flowchart of FIG. 7.

When a steering wheel of a vehicle is rotated, a relative displacement is produced between the shaft 11 and the shaft 13 (FIG. 1), and the amount of overlap between the sensor rings 17 and 18 (FIG. 1) changes, resulting in a change in the inductance of the torque sensing coil L. Since the LR oscillation circuit 22 of the torque detection circuit 21 oscillates in accordance with the inductance of the coil L, the LR oscillation circuit 22 generates a signal whose period is in proportion to the inductance of the coil L. The generated signal is subjected to wave-shaping performed by the pulse-shaping circuit 23 and is fed to the timer input 31 a of the microcomputer 31 as a torque signal (shown in FIG. 6A).

The temperature detection circuit 24 outputs a signal indicating the temperature of the torque sensing coil L to the AID input 31b of the microcomputer 31 as a temperature characteristic signal.

When the microcomputer 31 detects that a torque signal has been input to the timer input 31a (step (hereinafter referred to as "S") 10: Yes), the microcomputer 31 inputs a temperature characteristic signal (FIG. 6B) from the AID input 31b (S12) and calculates the period T (FIG. 6A) of the torque signal input in S10 while using a clock signal (S14) as a reference. Subsequently, the microcomputer 31 calculates the voltage V1 of the temperature characteristic signal input in S12 (S16) and calculates a temperature-compensated torque on the basis of the period T and the voltage V1 (S18).

This calculation of torque can be performed as follows. A first table which stores various values of the period T and corresponding torque values and a second table which stores various values of the voltage V1 and corresponding torque values are provided. A torque value extracted from the second table is added to a torque value extracted from the first table in order to obtain a torque value.

As described above, in the torque sensor of the present embodiment, the torque signal can be input directly to a microcomputer 31 without necessity of A/D conversion. Even when the amplitude of the signal generated by the LR oscillation circuit 22 changes due to variation in power source voltage, the period of the generated signal is not affected thereby, so that an accurate torque signal is input to the microcomputer.

In addition, the circuit configuration can be simplified, because a DC power source 81 for an oscillation circuit and an A/D conversion circuit 91 (see FIG. 2), which have been used in conventional torque sensors, become unnecessary. Moreover, since the LR oscillation circuit 22 includes no capacitor and is therefore hardly affected by temperature, torque detection can be performed with high accuracy.

Therefore, the torque sensor according to the present embodiment has improved reliability and can be manufactured at reduced cost.

Figure 8:
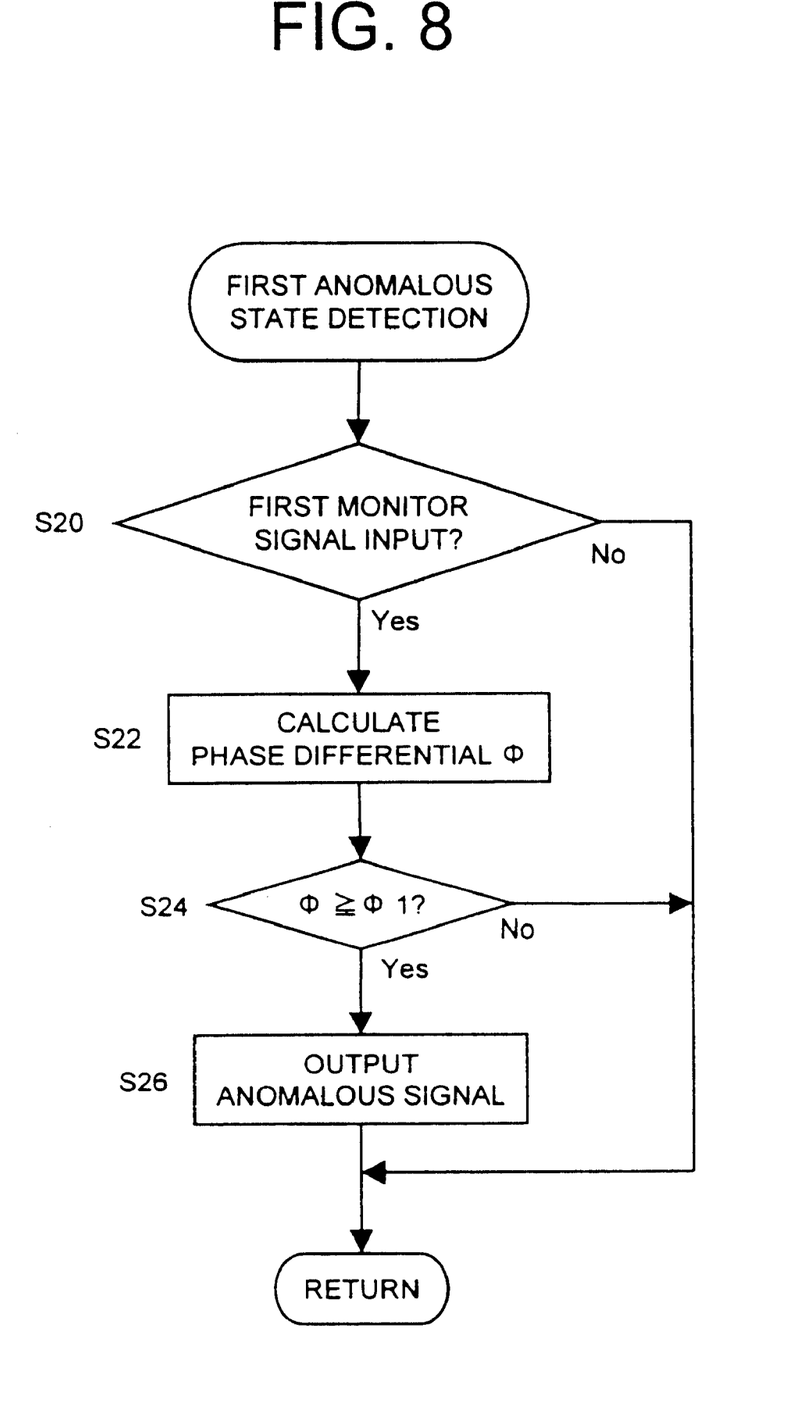
FIG. 8 is a flowchart showing first anomalous state detection processing performed by the microcomputer shown in FIG. 3.

Next, the processing that the microcomputer 31 performs in order to detect an anomalous state of the LR oscillation circuit 22 (hereinafter referred to as "first anomalous state detection processing) will be described with reference to the flowchart of FIG. 8.

When the microcomputer 31 detects that a first monitor signal (FIG. 6A) has been input to the timer input 31c (S20: Yes), the microcomputer 31 calculates a phase difference φ (FIG. 6A) between the torque signal and the first monitor signal (S22). Subsequently, the microcomputer 31 judges whether the calculated phase difference φ is equal to or greater than a threshold φ1 stored in unillustrated ROM or the like (S24). When the microcomputer 31 judges that the calculated phase difference φ is equal to or greater than a threshold φ1 (S24: Yes), the microcomputer 31 outputs an anomalous signal (S26).

This anomalous signal is output to, for example, an indicator of an instrument panel provided in the vehicle, so that the indicator provides a predetermined display indicting occurrence of an anomalous state.

As described above, the torque sensor of the present embodiment can detect an anomalous state of the LR oscillation circuit 22 on the basis of the phase difference φ between the torque signal and the first monitor signal. Therefore, the torque sensor of the present embodiment has improved reliability.

In addition, the accuracy in detecting an anomalous state of the LR oscillation circuit 22 can be increased, because variation in voltage level serving as noise does not affect the detection of an anomalous state.

Figure 9:
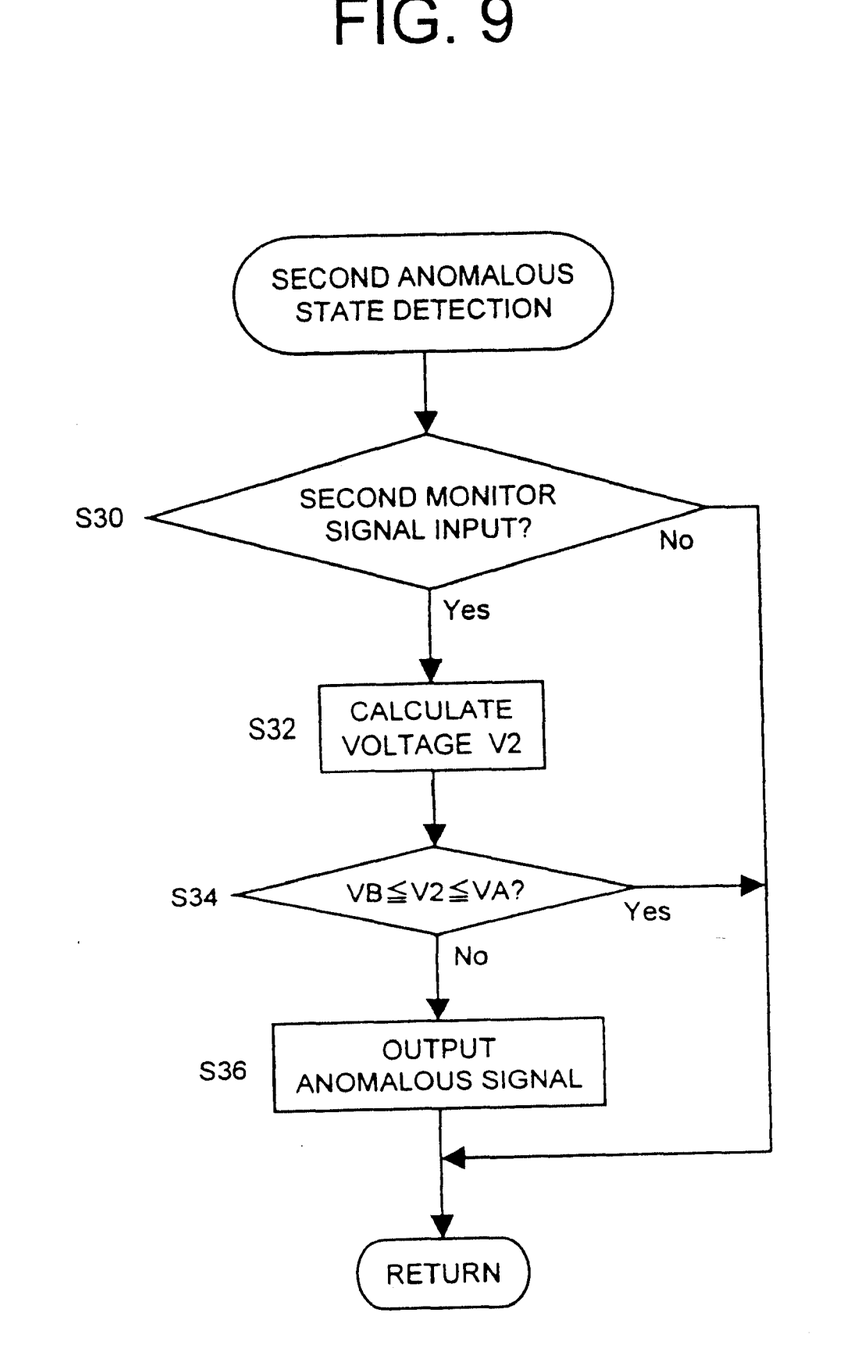
FIG. 9 is a flowchart showing second anomalous state detection processing performed by the microcomputer shown in FIG. 3.

Next, the processing that the microcomputer 31 performs in order to detect an anomalous state of the temperature detection circuit 24 and a layer short of the torque sensing coil L (hereinafter referred to as "second anomalous state detection processing) will be described with reference to the flowchart of FIG. 9.

When the microcomputer 31 detects that a second monitor signal (FIG. 6C) has been input to the A/D input 31 d (S30: Yes), the microcomputer 31 calculates the voltage signal V2 of the second monitor signal (S32). Subsequently, the microcomputer 31 judges whether the calculated voltage V2 falls within a normal range shown in FIG. 6C; i.e., whether the calculated voltage V2 is greater than voltage VB and less than voltage VA (S34). When the microcomputer 31 judges that the calculated voltage V2 is outside the normal range; i.e., that at least an anomalous state of the temperature detection circuit 24 or a layer short of the torque sensing coil L has occurred (S34: No), the microcomputer 31 outputs an anomalous signal (S36).

This anomalous signal is output to, for example, the indicator of the instrument panel provided in the vehicle, so that the indicator provides a predetermined display indicating occurrence of an anomalous state.

As described above, the torque sensor of the present embodiment can detect at least an anomalous state of the temperature detection circuit 24 or a layer short of the torque sensing coil L. Therefore, the torque sensor of the present embodiment has improved reliability.

In addition, since detection of a layer short is performed through comparison between a DC component obtained from the ungrounded end and a DC component obtained from the intermediate tap P of the torque sensing coil L, variation in the signal output from the torque sensing coil L does not affect the detection of a layer short of the torque sensing coil L. Accordingly, the accuracy in detecting a layer short of the torque sensing coil L can be improved.

The above-described configuration may be modified such that DC components are obtained from the coil portions L1 and L2, respectively, to be compared with each other. The position of the intermediate tap P is not limited to the center of the torque sensing coil L. Further, the number of divisions of the torque sensing coil L may be three or more.

Figure 10:
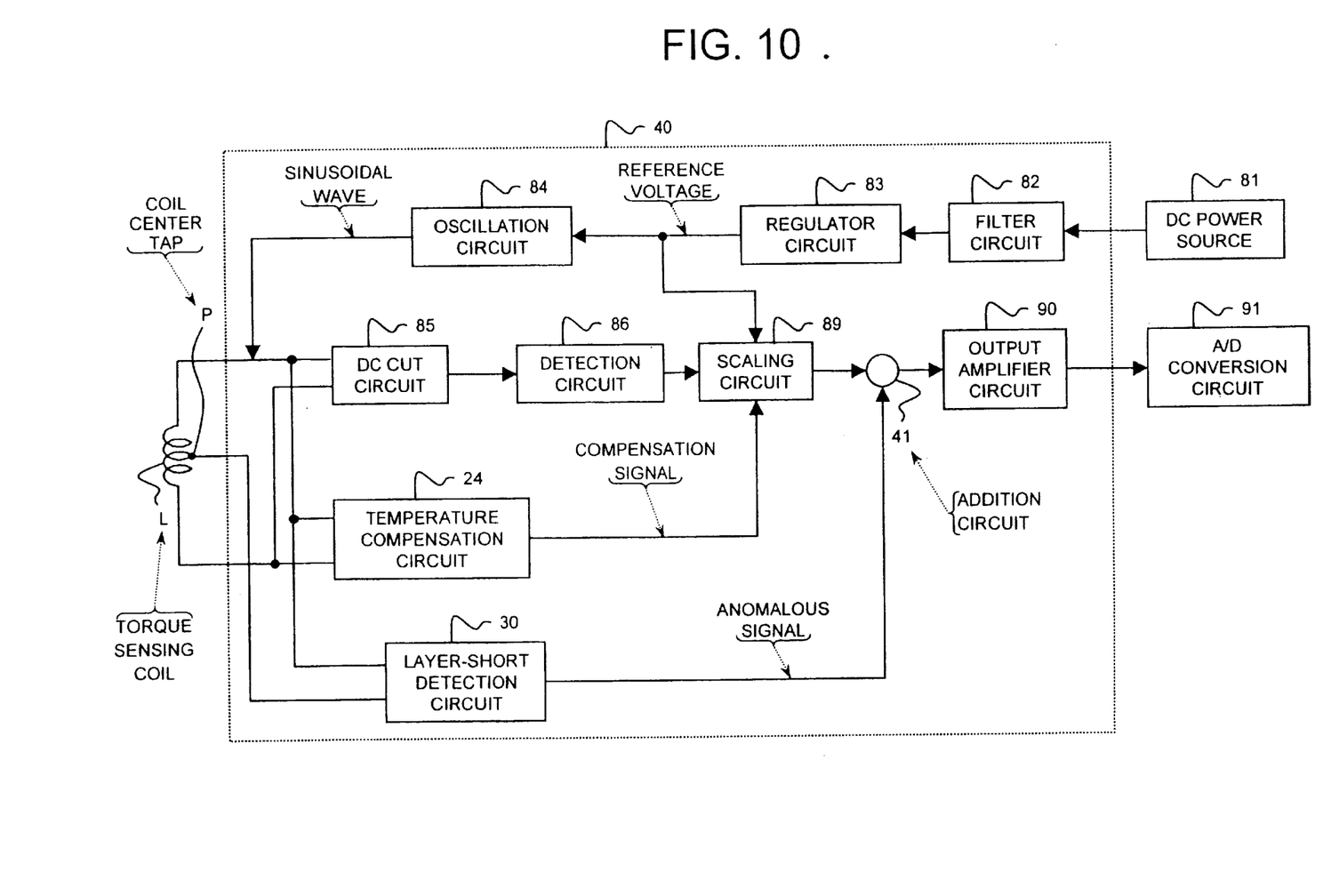
FIG. 10 is an explanatory diagram showing the configuration of another circuit for detecting a layer short of the torque sensing coil.

FIG. 10 is an explanatory diagram showing the configuration of another circuit for detecting a layer short of the torque sensing coil.

The torque sensing coil L has an intermediate tap P, and one end and the intermediate tap P of the torque sensing coil L are connected to the layer-short detection circuit 30. As described in the previous embodiment, the DC component of an AC/DC superposed signal generated at the one end and the DC component of an AC/DC superposed signal generated at the intermediate tap P are extracted and compared with each other. The result of the comparison is output to an addition circuit 41 as an anomalous signal.

The addition circuit 41 adds the anomalous signal to a torque component signal whose gain has been converted by the scaling circuit 89, and the torque component signal is output to an output amplifier circuit 90. Subsequently, the output amplifier circuit 90 amplifies the input torque component signal. The thus-amplified torque component signal is output to an A/D conversion circuit 91 as a torque signal and is converted into a digital signal, which is then output to a microcomputer provided in the vehicle. When the microcomputer judges that the input digital signal has reached a threshold value that has been stored in advance in ROM or the like as an anomalous value, the microcomputer performs an operation such as stopping assist of a steering apparatus.

As described above, when the torque sensor shown in FIG. 8 is used, a layer short of the torque sensing coil can be detected even in a torque sensor of a type in which torque is detected through use of a single torque sensing coil.

Figure 11:
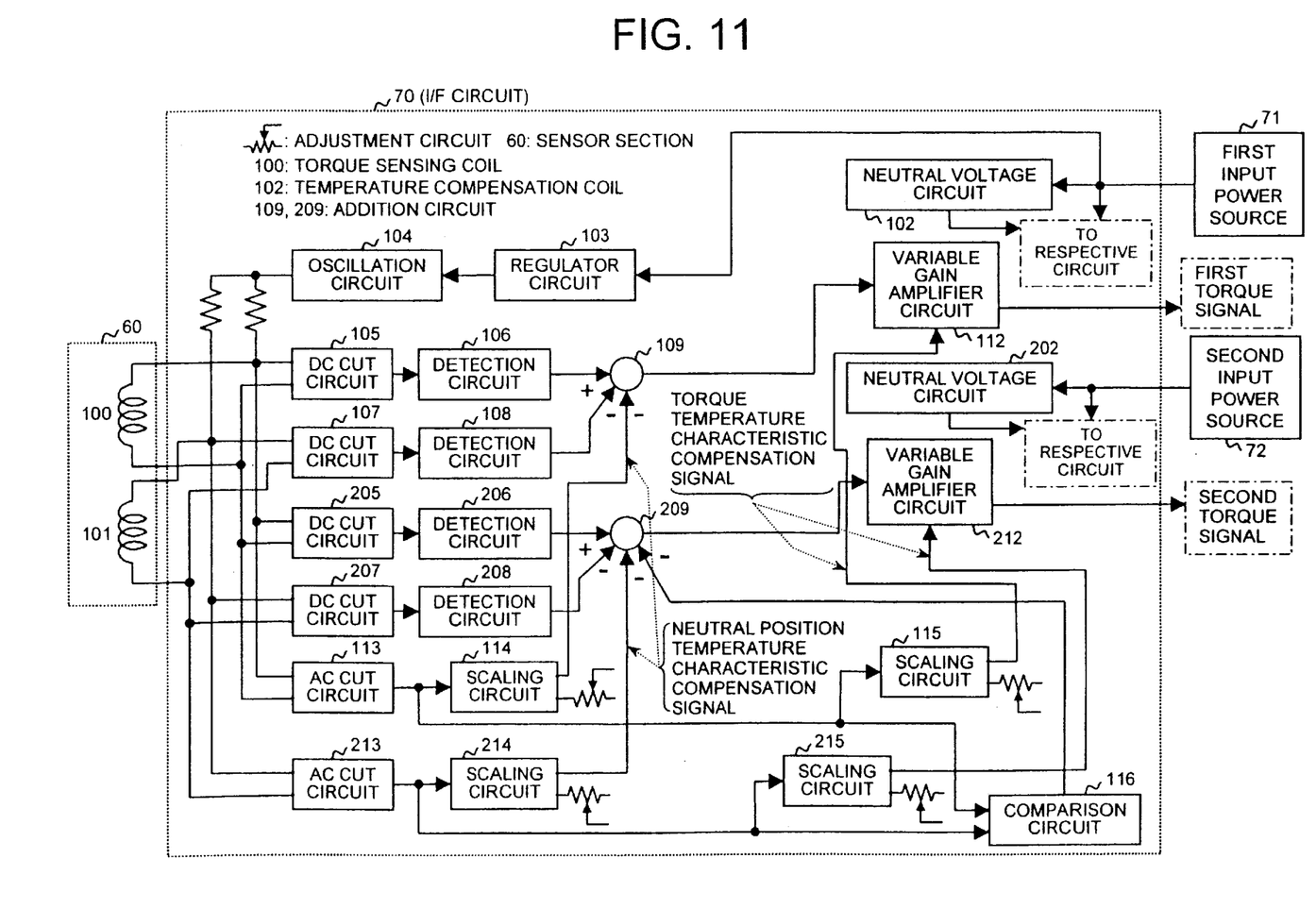
FIG 11 is an explanatory diagram showing the configuration of a circuit for detecting an anomalous state of an oscillation circuit in a torque sensor which comprises a torque sensing coil, a temperature compensation coil, and an oscillation circuit for applying a sinusoidal signal to each of the torque sensing coil and the temperature compensation coil.

FIG. 11 is an explanatory diagram showing the configuration of a circuit for detecting an anomalous state of an oscillation circuit in a torque sensor which comprises a torque sensing coil, a temperature compensation coil, and an oscillation circuit for applying a sinusoidal signal to each of the torque sensing coil and the temperature compensation coil.

An oscillation circuit 104 provided in an I/F circuit 70 applies a sinusoidal signal to each of a torque sensing coil 100 and a temperature compensation coil 101, which together constitute a sensor section 60. An AC/DC superposed signal generated at the torque sensing coil 100 is input to a DC cut circuit 105, so that an AC component of the AC/DC superposed signal is output from the DC cut circuit 105 as an AC signal. The AC signal is detected by a detection circuit 106 to be converted into a DC signal, which is input to an addition circuit 109.

Similarly, an AC/DC superposed signal generated at the temperature compensation coil 101 is input to a DC cut circuit 107, so that an AC component of the AC/DC superposed signal is output from the DC cut circuit 107 as an AC signal. The AC signal is detected by a detection circuit 108 to be converted into a DC signal, which is input to an addition circuit 109. The addition circuit 109 adds together the AC signal input from the detection circuit 106 and the AC signal input from the detection circuit 108. An AC signal resulting from the addition is amplified by a variable gain amplifier circuit 112, so that a first temperature-compensated torque signal is output from the variable gain amplifier circuit 112.

Further, in order to detect an anomalous state of the DC cut circuits 105 and 107, there are provided DC cut circuits 205 and 207, detection circuits 206 and 208, an addition circuit 209, and a variable gain amplifier circuit 212, so that a second temperature-compensated torque signal is output from the variable gain amplifier circuit 212.

That is, the microcomputer detects a difference between the first torque signal and the second torque signal, and when the detected difference is greater than a predetermined value, the microcomputer judges that an anomalous state has occurred in at least one of the DC cut circuit 105, the detection circuit 106, and the variable gain amplifier circuit 112.

The sinusoidal signal applied between the opposite ends of the torque sensing coil 100 is detected by an AC cut circuit 113, and a DC component of the sinusoidal signal is extracted thereby. Similarly, the sinusoidal signal applied between the opposite ends of the temperature compensation coil 101 is detected by an AC cut circuit 213, and a DC component of the sinusoidal signal is extracted thereby. These extracted DC components are compared by a comparison circuit 116. A signal indicting the result of the comparison is added to the addition circuit 209.

That is, when an anomalous state occurs in at least one of the torque sensing coil 100, the temperature compensation coil 101, the oscillation circuit 104, and a regulator circuit 103, a signal output from the comparison circuit 116 changes, with the result that the second torque signal changes, because the changed signal is added to the addition circuit 209. The microcomputer detects the change in the second torque signal and judges that an anomalous state has occurred in at least one of the torque sensing coil 100, the temperature compensation coil 101, the oscillation circuit 104, and the regulator circuit 103.

As described above, in the torque sensor shown in FIG. 11, DC components are derived from signals generated between the opposite ends of each of the torque sensing coil 100 and the temperature compensation coil 101, and these DC components are compared with each other. Therefore, an anomalous state that has occurred in at least one of the torque sensing coil 100, the temperature compensation coil 101, the oscillation circuit 104, and the regulator circuit 103 can be detected.

Figure 12:
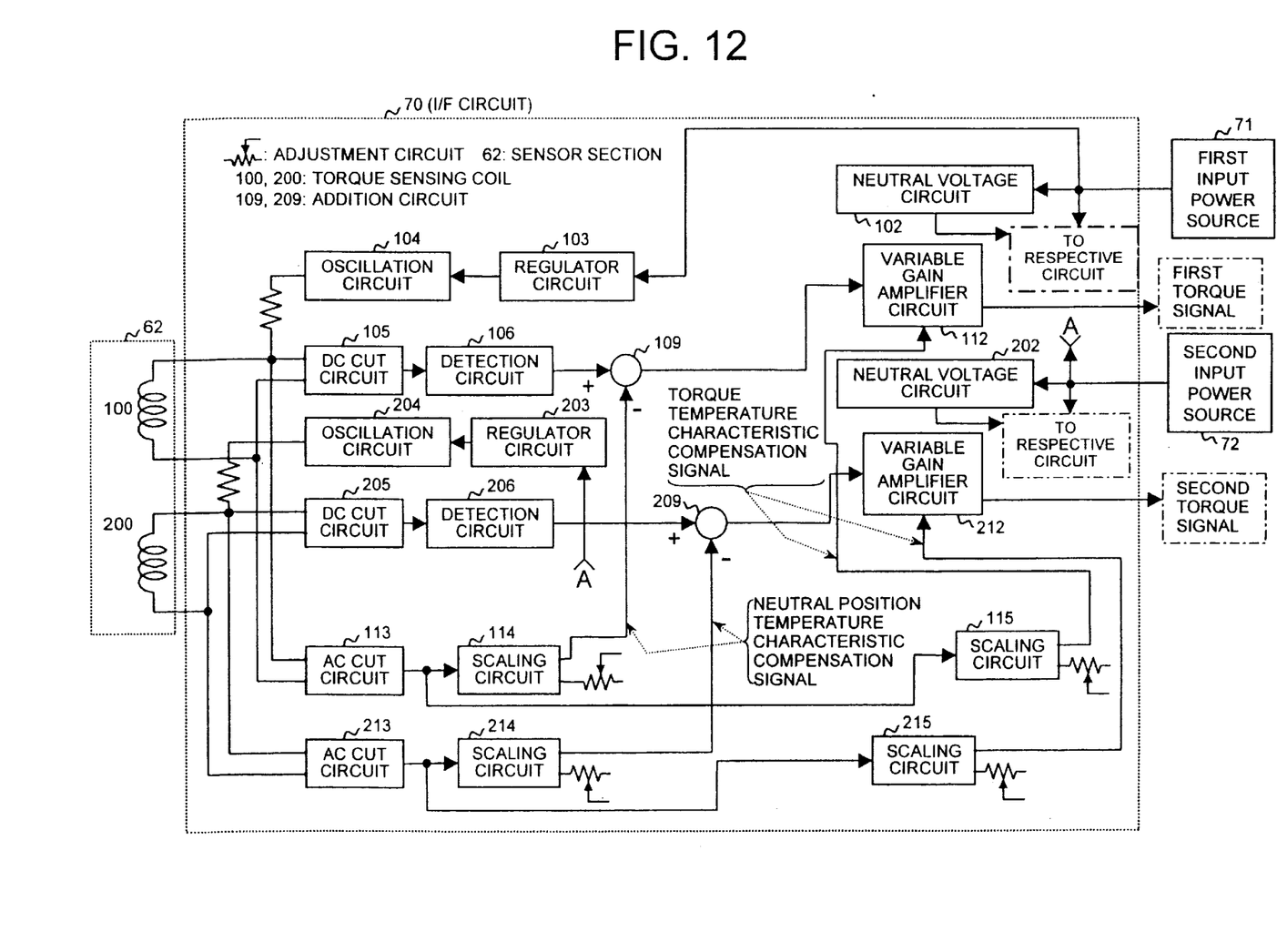
FIG. 12 is an explanatory diagram showing the configuration of a circuit which can compensate torque for temperature without use of a temperature compensation coil and which can detect an anomalous state of the oscillation circuit.

FIG. 12 is an explanatory diagram showing the configuration of a circuit which can compensate torque for temperature without use of a temperature compensation coil and which can detect an anomalous state of the oscillation circuit.

As shown in FIG. 12, two torque sensing coils 100 and 200 are provided in a sensor section 62, and a circuit connected to the torque sensing coil 100 and a circuit connected to the torque sensing coil 200 form a complete duplex system.

An oscillation circuit 104 applies a sinusoidal signal to the torque sensing coil 100, and an oscillation circuit 204 applies a sinusoidal signal to the torque sensing coil 200. The amplitude of a sinusoidal voltage generated across the coil 100 is detected by use of a DC cut circuit 105 and a detection circuit 106, and the amplitude of a sinusoidal voltage generated across the coil 200 is detected by use of a DC cut circuit 205 and a detection circuit 206. Simultaneously, the DC offset voltage of the sinusoidal voltage generated across the coil 100 is detected by use of a AC cut circuit 113, and the DC offset voltage of the sinusoidal voltage generated across the coil 200 is detected by use of a AC cut circuit 213. In each case, the thus-detected DC offset voltage is determined in accordance with the DC resistance of the torque sensing coil and the DC offset voltage applied thereto, regardless of an AC signal which changes in accordance with the inductance of the coil.

Therefore, when the DC resistance of the torque sensing coil changes depending on the temperature, a DC offset voltage whose magnitude is proportional thereto can be detected.

In other words, the DC offset voltage detected by the AC cut circuit is a signal that is proportional to temperature.

In order to use the signal for correction of torque, the offset and gain of the signal are adjusted by use of scaling circuits 114 and 214, so that the signal is converted to a compensation signal for the temperature characteristic at a neutral position (in a state in which no torque is applied). The compensation of the temperature characteristic at the neutral position can be performed by mere adjustment of the offset and gain, because the temperature characteristic at the neutral position has linearity.

In a manner similar to that as described above, a scaling circuit 115 converts the signal output from the AC cut circuit 113 to a signal for controlling a variable gain amplifier circuit 112, which corrects the temperature characteristic of the first torque signal; and a scaling circuit 215 converts the signal output from the AC cut circuit 213 to a signal for controlling a variable gain amplifier circuit 212, which corrects the temperature characteristic of the second torque signal. The temperature characteristic of each torque signal can be corrected through mere gain adjustment, because the change rate of each torque signal varies linearly with temperature; i.e., the slope of the temperature characteristic curve (regarded as a straight line) changes depending on the torque.

Further, when an anomalous state occurs in any of the circuits, the difference between the first and second torque signals changes, and the microcomputer can detect such an anomalous state through detection of the change.

As described above, when the torque sensor shown in FIG. 12 is used, temperature compensation of torque can be performed without use of a temperature compensation coil.

Further, since the circuit is configured in the form of a complete duplex system, an anomalous state of each sub-circuit can be detected.

In the above-described embodiments, there has been described a case in which the torque sensor of the present invention is applied to a steering apparatus of a vehicle. However, the present invention can be applied to other apparatuses which comprise a torque sensor of a type which detects variation in torque acting on an object through detection of variation in the inductance of a coil.

The LR oscillation circuit 22 corresponds to the first oscillation circuit of the present invention, and the LR oscillation circuit 26 corresponds to the second oscillation circuit of the present invention. The layer-short detection circuit 30 and the differential amplifier circuit 29 constitute the first comparison section of the present invention. The temperature detection circuit 24 corresponds to the first DC component detection section of the present invention; the temperature detection circuit 28 corresponds to the second DC component detection section of the present invention; and the differential amplifier circuit 29 corresponds to the third comparison section of the present invention.

The processing that the microcomputer performs in S14 functions as the period detection section of the present invention; and the processing that the microcomputer performs in S18 functions as the torque detection section of the present invention. Further, the processing that the microcomputer performs in S16 functions as the first DC component detection section of the present invention; and the processing that the microcomputer performs in S20–S24 functions as the second comparison section of the present invention. Moreover, the processing that the microcomputer performs in S26 functions as the first anomalous state detection section of the present invention; and the processing that the microcomputer performs in S30–S36 functions as the second anomalous state detection section of the present invention.

Obviously, numerous modifications and variations of the present invention are possible in light of the above teachings. It is therefore to be understood that within the scope of the appended claims, the present invention may be practiced otherwise than as specifically described herein.

What is claimed is:

1. A torque sensor which is provided with a coil whose inductance changes in accordance with variation in torque acting on an object and which detects the torque on the basis of the inductance of said coil, said torque sensor comprising:
   a first oscillation circuit for detecting the inductance of said coil and for oscillating a signal having a period corresponding to the detected inductance;
   period detection means for detecting the period of the signal generated by said first oscillation circuit; and
   torque detection means for detecting the torque based on the period detected by said period detection means.

2. A torque sensor according to claim 1, wherein a sensing region of said coil where the inductance of said coil is detected divided into a plurality of divided regions, and said torque sensor further comprises:
   a first comparison section for comparing a signal detected from one of the divided regions and a signal detected from a predetermined region; and
   a layer-short detection section for detecting a layer short of said coil on the basis of a result of comparison performed by said first comparison section.

3. A torque sensor according to claim 1, wherein
   a first DC component detection section is provided for detecting a DC component of current flowing through said coil; and
   said torque detection means is constructed to perform temperature compensation for the detected torque on the basis of the DC component detected by said first DC component detection section.

4. A torque sensor according to claim 3, further comprising:
   a second oscillation circuit for oscillating and outputting a signal having a period corresponding to the inductance of said coil;
   a second comparison section for comparing the signal output from said second oscillation circuit with the signal output from said first oscillation circuit; and
   a first anomalous state detection section for detecting an anomalous state of said first or second oscillation circuit on the basis of a result of the comparison performed by said second comparison section.

5. A torque sensor according to claim 4, further comprising:
   a second DC component detection section for detecting a DC component of current flowing through said coil;
   a third comparison section for comparing the DC component detected by said first DC component detection section with the DC component detected by said second DC component detection section; and a second anomalous state detection section for detecting an anomalous state of said first DC component detection section or said second DC component detection section on the basis of a result of the comparison performed by said third comparison section.

6. A torque sensor according to claim 2, wherein said first comparison section is configured to detect a first DC component derived from one of the divided regions and a second DC component derived from the predetermined region, and to compare the first and second DC components.

7. A torque sensor according to claim 4, wherein said first oscillation circuit is an LR oscillation circuit using said coil and a resistor.

8. A torque sensor according to claim 4, wherein said second comparison section is configured to compare the phase of the signal output from said first oscillation circuit with the phase of the signal output from said second oscillation circuit.

9. A torque sensor which is provided with a coil whose inductance changes in accordance with variation in torque acting on an object and which detects the torque on the basis of the inductance of said coil, said torque sensor comprising:

first oscillation means for detecting the inductance of said coil and for oscillating a signal having a period corresponding to the detected inductance;

period detection means for detecting the period of the signal generated by said first oscillation means; and torque detection means for detecting the torque based on the period detected by sail period detection means.

* * * * *